United States Patent
Hatke

Patent Number: 5,510,455
Date of Patent: Apr. 23, 1996

[54] THERMOTROPIC POLYMERS CONTAINING 2,5-DICARBOXYTHIOPHENE UNITS

[75] Inventor: Wilfried Hatke, Hofheim, Germany

[73] Assignee: Hoechst Celanese Corp., Somerville, N.J.

[21] Appl. No.: 361,614

[22] Filed: Dec. 22, 1994

[51] Int. Cl.$^6$ ............................ C08G 75/00; C08G 73/10
[52] U.S. Cl. ..................... 528/310; 528/312; 528/313; 528/321; 528/322; 528/324; 528/373; 528/377; 528/380
[58] Field of Search .................................. 528/310, 312, 528/313, 321, 322, 324, 373, 377, 380

[56] References Cited

U.S. PATENT DOCUMENTS

| | | | |
|---|---|---|---|
| 2,551,731 | 5/1951 | Drewitt | 528/293 |
| 5,266,677 | 11/1993 | Samulski et al. | 528/310 |
| 5,354,836 | 10/1994 | Samulski et al. | 528/125 |

OTHER PUBLICATIONS

R. Cai, et al., Macromolecules (1992), vol. 25, pp. 563–568.
R. Cai, et al., Liquid Crystals (1991), vol. 9, No. 5, pp. 617–634.
J. M. DeSimone, et al., Polymer Preprints (1991), vol. 32, No. 2, pp. 172–173.

*Primary Examiner*—Shelly A. Dodson
*Attorney, Agent, or Firm*—James L. McGinnis

[57] ABSTRACT

A new class of thermotropic liquid crystalline polymers comprises monomers units I, II, III, and IV, where

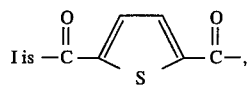

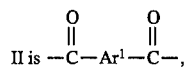

III is $-O-Ar^2-O-$, and

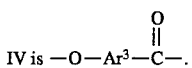

$Ar^1$, $Ar^2$ and $Ar^3$ are each independently selected from the group consisting of 1,3-phenylene, 1,4-phenylene, 2,6-naphthylene, 2,7-naphthylene, 4,4'-biphenylene, bis-aryl moieties having the formula

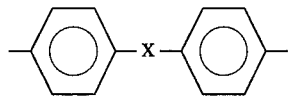

and mixtures thereof. In the bis-aryl moieties, each X can be S, O, CO, SO, $SO_2$, $C(CH_3)_2$ or $C(CF_3)_2$.

25 Claims, No Drawings

THERMOTROPIC POLYMERS CONTAINING 2,5-DICARBOXYTHIOPHENE UNITS

FIELD OF THE INVENTION

This invention relates to thermotropic liquid crystalline polymers, and more specifically, to thermotropic liquid crystalline polymers that are derived from 2,5-thiophenedicarboxylic acid as one of the monomers.

BACKGROUND OF THE INVENTION

Thermotropic liquid crystalline polymers (LCP's) are a well known class of polymeric compounds. Upon heating to a sufficiently high temperature, LCP's melt to form a liquid crystalline melt phase rather than an isotropic melt. Generally, LCP's consist of linear ("rigid rod") molecules that can line up to yield the desired liquid crystalline order. Thennotropic polymers also contain additional molecular units that break up the order enough to lower the melting point without destroying the liquid crystallinity. Examples of molecular units that lower the melting points of rigid rod polymers include isophthalate and 6-oxy-2-naphthoate. An alternate way to lower the melting temperature of a rigid rod polymer is to place a substituent on one or more of the rigid rod molecular units in the polymer, as for example using 2-phenyl-1,4-hydroquinone rather than unsubstituted 1,4-hydroquinone as a monomer.

2,5-Thiophenedicarboxylic acid (TDA) has a geometry that suggests that it may be useful for breaking up the molecular order in a rigid rod polymer. The carboxyl groups are at an angle of about 148°, intermediate between the linear geometry of the carboxyl groups of terephthalic acid (180°) and the bent geometry of isophthalic acid (120°). Only a single example of thermotropic liquid crystalline polymers that contain 2,5-dicarboxythiophene units has been reported (R. Cai, et al., *Macromolecules* (1992), 25, pp 563–568). The LCP's in that publication were derived from TDA and substituted 1,4-hydroquinone. Polymers of TDA and unsubstituted 1,4-hydroquinone were intractable, suggesting that the substituent on 1,4-ohydroquinone was necessary for liquid crystallinity to be achieved. It has also been reported that aromatic polyamides based partly on TDA form lyotropic LCP's (U.S. Pat. No. 5,266,677). Up to this time, it does not appear that TDA has been polymerized with aromatic diols and aromatic hydroxy acids to form liquid crystalline polymers.

SUMMARY OF THE INVENTION

The new class of melt processable liquid crystalline polymers of this invention comprises monomer units I, II, III and IV, where

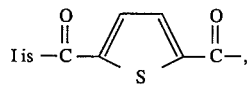

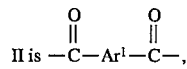

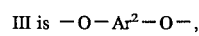

and

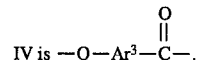

In these polymers, $Ar^1$, $Ar^2$ and $Ar^3$ are each independently selected from the group consisting of 1,3-phenylene, 1,4-phenylene, 2,6-naphthylene, 2,7-naphthylene, 4,4'-biphenylene, bis-aryl moieties ("BIS") having the formula

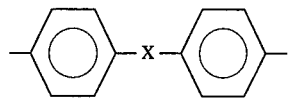

and mixtures thereof. In the bis-aryl moieties, each X is independently selected from S, O, CO, SO, $SO_2$, $C(CH_3)_2$ and $C(CF_3)_2$. Some of the hydrogen atoms on the aromatic rings of monomer units II, III and IV may optionally be replaced with one or more substituents, each independently selected from the group consisting of Br, F, Cl, I, phenyl, tolyl (i.e., methylphenyl), and alkyl and fluoroalkyl groups having the formula $C_n H_x F_y$, where n is an integer from 1 to 4, x and y are integers from 0 to 2n+1, and the sum of x and y is 2n+1. The number of hydrogen atoms in the aromatic rings that are replaced by substituents is generally less than half of the hydrogen atoms and preferably less than about 10%. Most preferably $Ar^1$, $Ar^2$ and $Ar^3$ are unsubstituted. Generally, no more than about half of the total amount of $Ar^1$, $Ar^2$ and $Ar^3$ may be in the form of the bis-aryl moieties (BIS) described above because the polymers tend to lose their liquid crystallinity with excessively high levels of bis-aryl moieties. Preferably less than about 25% of the total amount of $Ar^1$, $Ar^2$ and $Ar^3$ is in the form of the bis-aryl moieties, and most preferably less than about 10%. The amounts of monomer units I–IV on a mole % basis are in the range of about 2% to about 45% of monomer unit I, 0% to about 40% of monomer unit II, about 5% to about 47% of monomer unit III, and about 6% to about 90% of monomer unit IV. Preferably the polymer comprises on a mole % basis about 5% to about 30% of monomer unit I, 0% to about 35% of monomer unit II, about 15% to about 45% of monomer unit III, and about 10% to about 70% of monomer unit IV. Furthermore, the combined amounts of monomer units I and II are about equal to the amount of monomer unit III, on a mole basis.

The polymers are made by the condensation of monomers I', II', III', and IV', or reactive derivatives of the monomers, where I' is 2,5-thiophenedicarboxylic acid, shown below:

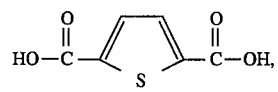

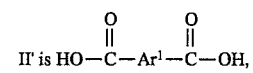

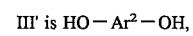

and

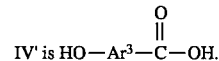

In the above monomers, $Ar^1$, $Ar^2$ and $Ar^3$ each have the formulas given above. The amounts of monomers I' to IV' as a mole percent of the total amounts of I' to IV' are in the range of about 2% to about 45% of monomer I', about 0% to about 40% of monomer II', about 5% to about 47% of monomer III', and about 6% to about 90% of monomer IV'. Preferably the amounts of I' to IV' are in the range of about 5% to about 30% of I', 0% to about 35% of II', about 15% to about 45% of III', and about 10% to about 70% of IV' on a mole basis. Furthermore, the combined amounts of monomers I' and II' are about equal to the amount of monomer III', on a mole basis.

DETAILED DESCRIPTION OF THE INVENTION

The polymers described herein form liquid crystalline mesophases when they are heated above their melting temperatures. This transition from solid polymer to liquid crystalline melt generally occurs at a temperature in the range of about 150° C. to about 400° C., preferably in the range of about 200° C. to about 350° C.

The polymers have a high enough molecular weight that they have an inherent viscosity greater than or equal to about 0.3 dl/g when measured as a 0.1% solution on a weight/volume basis in a solvent mixture of equal volumes of hexafluoroisopropanol and pentafluorophenol at 25° C. Preferably the inherent viscosity is greater than or equal to about 0.5 dl/g, and most preferably is greater than or equal to about 1.0 dl/g when measured under the conditions described above. The number average molecular weight of useful polymer is generally greater than or equal to about 5,000 and preferably is greater than or equal to about 10,000.

Preferably, the polymer comprises monomer units in which $Ar^1$ of monomer unit II is 1,3-phenylene, 1,4-phenylene, or a mixture thereof, so that II is isophthaloyl, terephthaloyl or a mixture thereof; $Ar^2$ of monomer unit III is 1,4-phenylene, 4,4'-biphenylene or a mixture thereof, so that III is the dioxy residue of 1,4-hydroquinone, 4,4'-biphenol or a mixture thereof; and $Ar^3$ of monomer unit IV is 1,4-phenylene, 2,6-naphthylene or a mixture thereof, so that IV is the residue of 4-hydroxybenzoic acid, 6-hydroxy-2-naphthoic acid, or a mixture thereof.

In one highly preferred embodiment, monomer unit II is isophthaloyl, terephthaloyl, or a mixture thereof, monomer unit III is the residue of 4,4'-biphenol and monomer unit IV is the residue of 4-hydroxybenzoic acid. Most preferably, the diacid moiety in this embodiment is terephathaloyl. This most preferred polymer comprises on a mole basis about 5% to about 30% of monomer unit I, derived from TDA, about 0 to about 25% of monomer unit II (terephthaloyl), about 15% to about 30% of monomer unit III (the dioxy residue of 4,4'-biphenol), and about 40% to about 70% of monomer unit IV (the residue of 4-hydroxybenzoic acid).

In a second highly preferred embodiment, the polymer comprises monomer units I, II, III, and IV, where I is the residue of TDA, II is isophthaloyl ($Ar^1$ is 1,3-phenylene), III is the dioxy residue of 1,4-hydroquinone ($Ar^2$ is 1,4-phenylene), and IV is the residue of 4-hydroxybenzoic acid ($Ar^3$ is 1,4-phenylene). The preferred amounts of monomer units I to IV in this embodiment on a mole basis are about 5% to about 30% of monomer unit I, about 0 to about 35% of monomer unit II, about 15% to about 40% of monomer unit III, and about 20% to about 70% of monomer unit IV.

The polymers described herein, as stated previously, are made by condensing monomers I', II', III', and IV', which give rise respectively to monomer units I, II, III, and IV. The monomers are known in the art. The preferred monomers are commercially available. The monomers themselves may be condensed directly, or more preferably, reactive derivatives of the monomers may be condensed. Reactive derivatives are compounds that condense more easily or more rapidly at lower temperatures or with fewer side products to yield the desired polymer. These include the acid chlorides of the acid groups of monomers I', II' and IV', which react readily with the phenolic groups of monomers III' and IV' to yield ester linkages. The acid chlorides normally are condensed in an interfacial polymerization reaction. Another kind of reactive group is the ester derived from phenol and the carboxylic acid group of monomers I', II', and IV'. These phenyl esters readily condense at elevated temperatures, generally in the molten phase, with aromatic hydroxyl groups to yield polymer and by-product phenol, which is removed by distillation.

A third kind of reactive derivative is the acetate ester (or other lower carboxylic acid ester, such as propionate or butyrate) of the hydroxyl groups of monomers III' and IV'. The ester derivatives react with the carboxylic acid groups of other monomers to yield ester linkages of the polymer and by-product acetic acid (or propionic or butyric acid), which is removed by distillation. This polymerization reaction is generally carded out in the melt, and is often referred to as "melt acidolysis polymerization." The acetate esters can also be made in situ by combining the monomers I', II', III', and IV' with sufficient acetic anhydride to convert all of the phenol groups of monomers I', II', III', and IV' to acetate groups. The amount of acetic anhydride on a mole basis is equal to or greater than the number of moles of monomer IV' added to twice the number of moles of monomer III'; often a slight excess of acetic anhydride, as for example about 2.5% excess, is used.

The reaction of the monomers and acetic anhydride (or other lower carboxylic acid anhydride) in which the esters are made in situ is generally carried out by heating a mixture of acetic anhydride and monomers, which apparently results first in acetylation of the hydroxyl groups followed by polymerization of the acetylated monomers. The polymerization generally takes place in the melt phase as the temperature increases. An example of this polymerization method using other monomers can be found in U.S. Pat. No. 4,473,682, incorporated herein by reference.

All of the above polymerization methods for making aromatic polyesters are well-known in the art. The preferred polymerization method is melt acidolysis polymerization. The procedure in which the acetate esters are made in situ and then polymerized is most convenient.

The polymers made according to this invention are useful in making shaped articles, such as fibers, films and molded articles. When the thermotropic polyesters are used as resins for injection molding, they are generally blended with fillers and other additives at levels up to about 70% by weight in order to achieve optimum properties. Fillers and additives that may be useful include one or more fillers or reinforcing agents selected from the following list, which is not a complete or exhaustive list: glass fiber, calcium silicate, silica, clays, talc, mica, polytetrafluoroethylene, graphite, alumina trihydrate, sodium aluminum carbonate, barium ferrite, wollastonite, carbon fiber, polymeric fiber, aluminum silicate fiber, titanium fiber, rock wool fiber, steel fiber, tungsten fiber and wollastonite fiber. Other kinds of additives that may be used in addition to fillers and reinforcing agents include oxidation stabilizers, heat stabilizers, light stabilizers, lubricants, mold release agents, dyes, pigments and plasticizers.

The shaped articles made by injection molding have excellent tensile properties, flexural properties and impact properties. The fibers and films also have excellent mechanical properties, making them useful in applications where high strength is needed.

This invention is further illustrated by the following non-limiting examples. In the examples, polymer compositions are expressed as the mole % of each monomer. Catalyst concentrations are expressed in parts per million (ppm). Temperatures are expressed in degrees Celsius. The abbreviation rpm means revolutions per minute.

EXAMPLES

*Synthesis of Polymer Grade TDA.* Polymer grade 2,5-thiophenedicarboxylic acid (TDA) was synthesized in three steps by a modification of a method described in East German Patent No. 129,448 (1978) and a publication (S. Nakagawa, et al., *Tetrahedron Letters* (1970), p. 3719). In the first step, the diacid chloride of TDA was made by the reaction of adipic acid and thionyl chloride. This was then converted to the dimethyl ester by reaction with methanol. Finally, the dimethyl ester was hydrolyzed to the diacid. These steps are described in detail below.

The synthesis of the acid chloride was conducted in a 2 liter three-neck flask equipped with a heating mantle, reflux condenser, thermometer and mechanical stirrer. Adipic acid (201.4 g, 1.38 moles) was slowly added to 1 liter of thionyl chloride which contained about 15 ml pyridine as catalyst. The slurry was slowly heated until the thionyl chloride started to boil. The solution was then refluxed for 40 hours. Hydrogen chloride and sulfur dioxide that formed were scrubbed from the vapors with aqueous sodium hydroxide solution. Thionyl chloride was then distilled off until the temperature of the reaction mixture reached about 150° C. After 4 hours of stirring at 150° C., the mixture was cooled to room temperature and transferred into a 500 ml one-neck flask. The residual thionyl chloride was distilled off and the crude reaction product was distilled through a short-path distillation apparatus. A mixture (185 g) of yellow solid and liquid were collected at 90° C. to 105° C. at 30 millibar. The distillate was slowly added to 1 liter of methanol. The resulting slurry was refluxed for 2 hours to complete the esterification of the acid chloride. After the addition of 1.5 liters methanol and 500 ml chloroform, a clear solution with a gummy residue on the bottom of the flask was obtained. The solution could easily be decanted from the residue, which stuck to the flask. The solution was slowly cooled to −10° C. to yield the dimethyl ester, which was filtered off, washed with cold methanol and dried under vacuum. The yield was 102 g with a melting point of 142.5° C. Purity by DSC was 99.88%.

The dimethyl ester ( 100.1 g, 0.5 moles) was placed in a 2 liter three-neck flask equipped with a mechanical stirrer and reflux condenser. After addition of 1 liter of 1.3M potassium hydroxide solution, the mixture was slowly heated and subsequently stirred under reflux for 5 hours. The solution was cooled to room temperature, neutralized with hydrochloric acid, and filtered. The filtrate was acidified with hydrochloric acid and stirred at room temperature for 30 minutes. The precipitated acid was filtered, washed with deionized water and dried under vacuum. The yield of diacid was 76 g (88%), m.p.>300° C. (dec.).

EXAMPLE 1

A polymer composed of 60 mole % of 4-hydroxybenzoic acid, 10 mole % terephthalic acid, 10 mole % of thiophene-dicarboxylic acid, and 20 mole % 4,4'-biphenol was synthesized as follows. 4-Hydroxybenzoic acid (165.6 g, 1.2 moles), thiophenedicarboxylic acid (34.4 g, 0.2 moles), terephthalic acid (33.2 g, 0.2 moles), 4,4'-biphenol (74.4 g, 0.4 moles), potassium acetate (0.020 g, 75.5 ppm), and acetic anhydride (211.4 g, 99% purity, 2.5% excess) were combined under nitrogen in a 1-liter 3-necked "slim Jim" flask equipped with a vigreaux column and condenser, nitrogen inlet, thermocouple, and stainless steel "C"-shaped stirrer. The flask was heated in a fluidized sand bath. The temperature was controlled by a programmable MicRIcon® control unit according to the following profile, In each step of the profile, the temperature was gradually increased from the temperature of the previous step to the next higher temperature during the time specified for that step (in minutes).

| Temperature | 25° | 125° | 140° | 150° | 200° | 210° | 220° | 275° | 310° | 335° | 350° |
|---|---|---|---|---|---|---|---|---|---|---|---|
| Time of temp increase (min) | — | 50 | 40 | 20 | 45 | 5 | 6 | 50 | 80 | 25 | 15 |

The temperature was then held at 350° C. for 15 minutes, after which vacuum was applied. Stirring was continued under vacuum until the torque measurement on the stirring motor increased by about 9 mV at 75 rpm. The temperature ranged from about 350° to about 365° C. during this time of heating under vacuum (17 minutes). The reactor was then cooled to room temperature, the vacuum was released, and the polymer was recovered by breaking the flask. The polymer plug was then cut into small pieces, which were ground into small particles. Physical and fiber properties of this polymer are reported in Tables 1 and 2.

EXAMPLE 2

A polymer of 4-hydroxybenzoic acid (35 mole %), 1,4-hydroquinone (32.5 mole %), isophthalic acid (22.5 mole %) and thiophenedicarboxylic acid (10 mole %) was made according to the following procedure. 4-Hydroxybenzoic acid (96.6 g, 0.7 moles), 1,4-hydroquinone (71.5 g, 0.65 moles), isophthalic acid (74,7 g, 0,45 moles), thiophenedicarboxylic acid (34.4 g, 0.2 moles), potassium acetate (0.017 g, 60 ppm) and 2.5% excess acetic anhydride (211.4 g, 99% purity, 2.05 moles) were combined under nitrogen in a 1-liter 3-necked "slim Jim" flask equipped with a vigreaux column and condenser, nitrogen inlet, thermocouple, and stainless steel "C"-shaped stirrer. As in Example 1, the flask was heated in a fluidized sand bath, the temperature of which was controlled by a programmable MicRIcon™ control unit. The following temperature profile was used:

| Temperature | 25° | 125° | 150° | 200° | 250° | 300° | 320° |
|---|---|---|---|---|---|---|---|
| Time of temp ramp (min.) | — | 60 | 50 | 50 | 50 | 100 | 40 |

The temperature was then held at 320° for 15 minutes. Vacuum was applied at 320° with stirring until the torque voltage that was required to maintain stirring at 75 rpm had increased by 14 mV (37 minutes of stirring under vacuum at about 320°–337° C.). The vacuum at this point was 8 millibar. Stirring was stopped, and the reactor was cooled to room temperature. After the flask cooled, it was broken; the polymer plug was cut into small pieces and was then ground into small particles. Physical properties of this polymer are presented in Table 1.

Comparative Example 1 (C-1)

A polymer similar in composition to that of Example 1 but not containing TDA was synthesized as follows. The monomer composition was 60 mole % 4-hydroxybenzoic acid, 10 mole % terepthalic acid, 10 mole % isophthalic acid, and 20 mole % 4,4'-biphenol. The polymer was made on a 2-mole scale using the same procedure as was used in Example 1, including the same catalyst (at 60 ppm) and the same temperature profile. At the end of the temperature program, the molten polymer was stirred at about 353°–366° C. under vacuum for 18 minutes, during which time the torque increased by about 12 mV. Physical and fiber properties of this polymer are presented in Tables 1 and 2.

Comparative Example 2 (C-2)

A polymer was made with the following monomer composition: 35 mole % 4-hydroxybenzoic acid, 32.5 mole % 1,4-hydroquinone, 32.5 mole % isophthalic acid. The polymer was made on a 2-mole scale following essentially the procedure of Example 2, except that the final temperature of the temperature program was 340° C. instead of 320° C. Physical properties of this polymer are presented in Table 1.

TESTING

Polymer Properties.

The physical properties of the four polymers of Examples 1, 2, C-1, and C-2 were measured as follows. Thermal analysis (i.e. differential scanning calorimetry) was carried out on a Perkin-Elmer DSC-7. Inherent viscosity (I.V.) (average of two trials) was measured at 25° C. as a 0.1% solution (wt/volume) in a mixture of equal parts by volume of hexafluoroisopropanol and pentafluorophenol. Melt viscosities were measured using a Kayeness Melt Rheometer model 2052 having a Hastelloy barrel and plunger tip. The orifice of the capillary was 0.015 inches in diameter and 1 inch in length. The physical properties of the polymers are summarized in Table 1.

Samples of polymer from Examples 1 and C-1 were melt spun into single filament fiber through a spinneret having a single hole with a diameter of 0.127mm (5 mils) and a length of 0.178 mm. The polymer of Example C-1 was spun at about 335° C. with a maximum take-up speed of about 2000 m/min to yield a 4.7 dpf fiber. The pack pressure was about 70 psi. The polymer of Example 1 was spun at about 340° C. with a maximum take-up speed of about 400 m/min to yield a 10 dpf fiber. The pack pressure was as high as 750 psi during the spinning.

The tensile properties of the two as-spun fiber samples were measured using ASTM method D3822 at a gauge length of 1 inch. The fibers were then heat treated in an oven in an unstressed state at an elevated temperature for several hours. The properties of the as-spun and heat-treated fiber are reported in Table 2. The tenacity and modulus are reported in Table 2 in grams per denier (gpd).

Microscopy

The polymer samples of Examples 1 and 2 were examined by hot stage microscopy. The samples were cut into thin sections using a glass knife microtome. The sections were mounted on quartz slides and heated at a rate of 20° C./min. to 450° C. while observing the samples at 20× magnification through crossed polarizers. Both samples showed liquid crystallinity in the melt phase, as described below.

The polymer of Example 1 had a coarse crystalline structure at room temperature. At 345° C., the polymer underwent a transition to a nematic phase, which was still present at the maximum temperature of the experiment (450° C.).

The polymer of Example 2 had a fine-domain crystalline structure at room temperature. A transition to a nematic phase occurred at 245° C. At 340° C., the polymer formed a coarse schlieren morphology and began a transition to an isotropic phase. The sample consisted of about 50% isotropic phase at 450° C. On cooling, the isotropic phase crystallized at 340° C. The quenched sample consisted of coarse schlieren and fine crystalline phases (less than 1 micron crystallites).

TABLE 1

Physical Properties

| Examples | Composition (mole %)[1] | | | | | | I.V. (dl/g) | Melt viscosity (1000/s (°C./poise)[2] | DSC Tm (°C.) | Tc (°C.) | Tg (°C.) |
| --- | --- | --- | --- | --- | --- | --- | --- | --- | --- | --- | --- |
| | HBA | TA | HQ | IA | TDA | BP | | | | | |
| 1 | 60 | 10 | — | — | 10 | 20 | 1.77 | 320°/750 | 329 | 289 | —[3] |
| 2 | 35 | — | 32.5 | 22.5 | 10 | — | 0.3 | 300°/270 | —[3] | —[3] | 93 |
| C-1 | 60 | 10 | — | 10 | — | 20 | 2.05 | 300°/330 | 317 | 252 | —[3] |
| C-2 | 35 | — | 32.5 | 32.5 | — | — | 0.46 | 330°/170 | 289 | 244 | 131 |

[1]HBA = 4-hydroxybenzoic acid; TA = terephthalic acid; HQ = 1,4-hydroquinone; IA = isophthalic acid; TDA = 2,5-thiophenedicarboxylic acid; BP = 4,4'-biphenol
[2]Melt viscosity measured at 1000 sec-[1]. Entries show melt temperature (°C.) and viscosity in poise.
[3]Not observed.

TABLE 2

| | Fiber Properties | | | | | |
|---|---|---|---|---|---|---|
| | As-spun | | | Heat-treated | | |
| Examples | Tenacity (gpd) | Elongation (%) | Modulus (gpd) | Tenacity (gpd) | Elongation (%) | Modulus (gpd) |
| 1 | 2.3 | 0.6 | 420 | 5.8 | 1.1 | 570 |
| C-1 | 3.8 | 0.9 | 500 | 20.8 | 3.6 | 560 |

It is to be understood that the above described embodiments of the invention are illustrative only and that modification throughout may occur to one skilled in the art. Accordingly, this invention is not to be regarded as limited to the embodiments disclosed herein.

We claim:

1. A thermotropic aromatic polymer comprising monomer units I, II, III, and IV, where

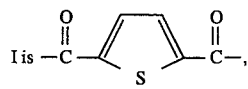

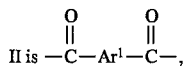

III is $-O-Ar^2-O-$, and

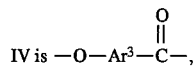

wherein $Ar^1$, $Ar^2$ and $Ar^3$ are each selected from the group consisting of 1,3-phenylene, 1,4-phenylene, 2,6-naphthylene, 2,7-naphthylene, 4,4'-biphenylene, bis-aryl moieties having the structure

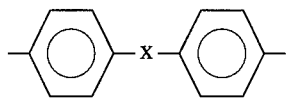

and mixtures thereof, where each X is independently selected from the group consisting of S, O, CO, SO, $SO_2$, $C(CH_3)_2$ and $C(CF_3)_2$;

wherein said bis-aryl moieties comprise less than about 50% of the total number of moles of said $Ar^1$, $Ar^2$ and $Ar^3$;

wherein one or more of the hydrogen atoms on said aromatic moieties $Ar^1$, $Ar^2$, and $Ar^3$ may optionally be replaced with substituents independently selected from the group consisting of Br, F, Cl, I, phenyl, tolyl, and alkyl and fluoroalkyl groups having the formula $C_nH_xF_y$, where n is an integer from 1 to 4, x and y are integers from 0 to 2n+1, and the sum of x and y is 2n+1;

wherein said polymer comprises on a mole basis about 2% to about 45% of monomer unit I, about 0% to about 40% of monomer unit II, about 5% to about 47% of monomer unit III, and about 6% to about 90% of monomer unit IV; and wherein the combined amount of monomer units I and II is about equal to the amount of monomer unit III.

2. The thermotropic aromatic polymer recited in claim 1, wherein said bis-aryl moieties comprise less than about 25% of the total number of moles of said aromatic moieties $Ar^1$, $Ar^2$, and $Ar^3$; and wherein said polymer comprises on a mole basis about 5% to about 30% of said monomer unit I, about 0% to about 35% of said monomer unit II, about 15% to about 45% of said monomer unit III, and about 10% to about 70% of said monomer unit IV.

3. The thermotropic aromatic polymer recited in claim 2, wherein said bis-aryl moieties comprise less than about 10% of the total number of moles of said aromatic moieties $Ar^1$, $Ar^2$, and $Ar^3$.

4. The thermotropic aromatic polymer recited in claim 1, wherein said polymer undergoes a transition from a solid phase to a liquid crystalline melt at a temperature in the range of about 150° C. to about 400° C.

5. The thermotropic aromatic polymer recited in claim 1, wherein said polymer undergoes a transition from a solid phase to a liquid crystalline melt at a temperature in the range of about 200° C. to about 350° C.

6. The thermotropic aromatic polymer recited in claim 1, wherein said polymer has an inherent viscosity greater than or equal to about 0.5 dl/g when measured as a 0.1 % solution on a weight/volume basis in a mixture of equal volumes of hexafluoroisopropanol and pentafluorophenol at 25° C.

7. The thermotropic aromatic polymer recited in claim 1, wherein said polymer has an inherent viscosity greater than or equal to about 1.0 dl/g when measured as a 0.1% solution on a weight/volume basis in a mixture of equal volumes of hexafluoroisopropanol and pentafluorophenol at 25° C.

8. The thermotropic aromatic polymer recited in claim 1, wherein said aromatic moieties $Ar^1$, $Ar^2$, and $Ar^3$ are unsubstituted and are each selected from the group consisting of 1,3-phenylene, 1,4-phenylene, 2,6-naphthylene, 2,7-naphthylene, 4,4'-biphenylene, and mixtures thereof.

9. The thermotropic aromatic polymer recited in claim 1, wherein said polymer has a number average molecular weight greater than or equal to about 5000.

10. The thermotropic aromatic polymer of claim 1, wherein said polymer has a number average molecular weight greater than or equal to about 10,000.

11. The thermotropic aromatic polymer of claim 1, wherein $Ar^1$ of said monomer unit II is 1,3-phenylene, 1,4-phenylene, or a mixture thereof;

wherein $Ar^2$ of said monomer unit III is 1,4-phenylene, 4,4'-biphenylene or a mixture thereof; and wherein $Ar^3$ of said monomer unit IV is 1,4-phenylene or 2,6-naphthylene.

12. The thermotropic aromatic polymer of claim 11, wherein $Ar^2$ of said monomer unit III is 4,4'-biphenylene, and $Ar^3$ of said monomer unit IV is 1,4-phenylene.

13. The thermotropic aromatic polymer of claim 12, wherein $Ar^1$ of said monomer unit II is 1,4-phenylene.

14. The thermotropic aromatic polymer of claim 13, said polymer comprising on a mole basis about 5% to about 30% of said monomer unit I, about 0 to about 25% of said monomer unit II, about 15% to about 30% of said monomer unit III, and about 40% to about 70% of said monomer unit IV.

15. The thermotropic aromatic polymer of claim 1, wherein $Ar^1$ of said monomer unit II is 1,3-phenylene; $Ar^2$ of said monomer unit III is 1,4-phenylene; and $Ar^3$ of said monomer unit IV is 1,4-phenylene.

16. The thermotropic aromatic polymer of claim 15, said polymer comprising on a mole basis about 5% to about 30% of said monomer unit I, about 0 to about 35% of said monomer unit II, about 15% to about 40% of said monomer unit III, and about 20% to about 70% of said monomer unit IV.

17. A shaped article comprising said thermotropic aromatic polymer recited in claim 14.

18. A shaped article comprising said thermotropic aromatic polymer recited in claim 16.

19. A method of making a melt processable thermotropic liquid crystalline polymer comprising the step of heating monomers I', II', III', and IV', or reactive derivatives thereof, to a temperature high enough to condense said monomers to yield a polymer, where

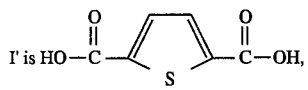

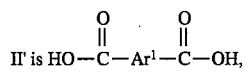

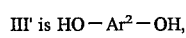

and

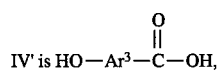

where $Ar^1$, $Ar^2$ and $Ar^3$ are each selected from the group consisting of 1,3-phenylene, 1,4-phenylene, 2,6-naphthylene, 2,7-naphthylene, 4,4'-biphenylene, bis-aryl moieties having the structure

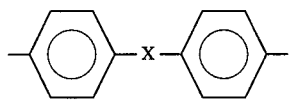

and mixtures thereof, where each X is independently selected from the group consisting of S, O, CO, SO, $SO_2$, $C(CH_3)_2$ and $C(CF_3)_2$;

wherein said bis-aryl moieties comprise less than about 50% of the total number of moles of said $Ar^1$, $Ar^2$, and $Ar^3$;

wherein one or more of the hydrogen atoms in said aromatic moieties $Ar^1$, $Ar^2$, and $Ar^3$ may optionally be replaced with substituents independently selected from the group consisting of Br, F, Cl, I, phenyl, tolyl, and alkyl and fluoroalkyl groups having the formula $C_nH_xF_y$, where n is an integer from 1 to 4, x and y are integers from 0 to 2n+1, and the sum of x and y is 2n+1;

wherein the amounts of said monomers I', II', III', and IV' as a mole % of the combined number of moles of said monomers I', II', III', and IV' are about 2% to about 45% of monomer I', about 0% to about 40% of monomer II', about 5% to about 47% of monomer III', and about 6% to about 90% of monomer IV'; and wherein the combined amount of said monomers I' and II' is about equal to the amount of said monomer III', on a mole basis.

20. The method recited in claim 19, wherein said bis-aryl moieties comprise less than about 25% of the total number of moles of said aromatic moieties $Ar^1$, $Ar^2$, and $Ar^3$; and wherein tile amounts of said monomers I', II', III', and IV' on a mole basis are about 5% to about 30% of said monomer I', about 0% to about 35% of said monomer II', about 15% to about 45% of said monomer III', and about 10% to about 70% of said monomer IV'.

21. The method recited in claim 20, where said bis-aryl moieties comprise less than about 10% of the total number of moles of said aromatic moieties $Ar^1$, $Ar^2$, and $Ar^3$.

22. The method recited in claim 20, wherein said reactive derivatives are selected from the group consisting of (a) the phenyl esters of the carboxylic acid groups of said monomers I', II', and IV', and (b) the acetate esters of the aromatic hydroxyl groups of said monomers III' and IV'.

23. The method recited in claim 20, wherein said monomers I', II', III' and IV' are heated in the presence of acetic anhydride in sufficient amount to convert all of the hydroxyl groups of said monomers III' and IV' to acetate esters.

24. The method recited in claim 23, wherein the amount of said acetic anhydride is greater than or equal to the sum of the number of moles of monomer IV' and twice the number of moles of monomer III'.

25. A method for making a melt processable thermotropic liquid crystalline polymer comprising the step of stirring the acid chloride of monomers I', II', and IV' with monomer III' to yield a polymer by interfacial polymerization, where

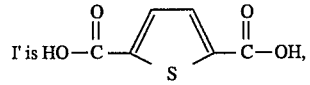

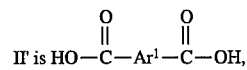

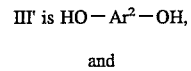

and

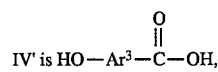

where $Ar^1$, $Ar^2$ and $Ar^3$ are each selected from the group consisting of 1,3-phenylene, 1,4-phenylene, 2,6-naphthylene, 2,7-naphthylene, 4,4'-biphenylene, bis-aryl moieties having the structure

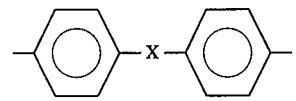

and mixtures thereof, where each X is independently selected from the group consisting of S, O, CO, SO, $SO_2$, $C(CH_3)_2$ and $C(CF_3)_2$;

wherein said bis-aryl moieties comprise less than about 50% of the total number of moles of said $Ar^1$, $Ar^2$, and $Ar^3$;

wherein one or more of the hydrogen atoms in said aromatic moieties $Ar^1$, $Ar^2$, and $Ar^3$ may optionally be replaced with substituents independently selected from the group consisting of Br, F, Cl, I, phenyl, tolyl, and alkyl and fluoroalkyl groups having the formula $C_nH_xF_y$, where n is an integer from 1 to 4, x and y are integers from 0 to 2n+1, and the sum of x and y is 2n+1;

wherein the amounts of said monomers I', II', III', and IV' as a mole % of the combined number of moles of said monomers I', II', III', and IV' are about 2% to about 45% of monomer I', about 0% to about 40% of monomer II', about 5% to about 47% of monomer III', and about 6% to about 90% of monomer IV'; and wherein the combined amount of said monomers I' and II' is about equal to the amount of said monomer III', on a mole basis.

* * * * *